United States Patent [19]

Burka

[11] Patent Number: 5,136,896
[45] Date of Patent: Aug. 11, 1992

[54] ROTARY INDEXING APPARATUS

[75] Inventor: Eric S. Burka, Lexington, Ky.

[73] Assignee: Versa Tech Engineering, Lexington, Ky.

[21] Appl. No.: 723,843

[22] Filed: Jul. 1, 1991

Related U.S. Application Data

[63] Continuation-in-part of Ser. No. 617,619, Nov. 26, 1990, abandoned.

[51] Int. Cl.⁵ .............................................. B23Q 16/06
[52] U.S. Cl. ...................................... 74/813 L; 279/5; 92/122
[58] Field of Search .................. 409/221, 61; 279/5; 74/813 L, 813 C, 822; 92/23, 24, 28, 122, 125; 192/18 A, 1.36, 67 P, 67 R; 51/125.5, 216 ND, 229

[56] References Cited

U.S. PATENT DOCUMENTS

| 912,124 | 2/1909 | Hanson | 74/822 |
| 2,796,776 | 6/1957 | Locke, Sr. et al. | 74/822 |
| 3,186,260 | 6/1965 | Dugas | 74/822 |
| 3,429,203 | 2/1969 | Bass | 74/822 |

FOREIGN PATENT DOCUMENTS

| 207654 | 12/1962 | Switzerland | 74/813 L |
| 1195348 | 6/1970 | United Kingdom | 74/813 L |

Primary Examiner—Larry I. Schwartz
Assistant Examiner—R. Schultz
Attorney, Agent, or Firm—King & Schickli

[57] ABSTRACT

A rotary indexing apparatus includes a housing and an indexing member in the form of a plate mounted for rotation in the housing. Locating pins are received in apertures in the indexing plate to effectively lock the indexing plate and an affixed spindle in an indexed position. The apparatus also includes a rotary cylinder assembly including a pair of diametrically opposed rotary vanes mounted for reciprocation within a cavity formed in the housing. A partition plate divides the cavity into two separate compartments with each of the compartments divided by the rotary vane into a pair of variable volume chambers. Each of the rotary vanes also includes a piston assembly having an integral indexing pin that may be selectively extended into the apertures in the indexing plate thereby displacing the locating pins. A pressurized fluid source is provided to displace the rotary vanes through a selected angle and thereby index the indexing plate and attached spindle in the desired manner.

15 Claims, 4 Drawing Sheets

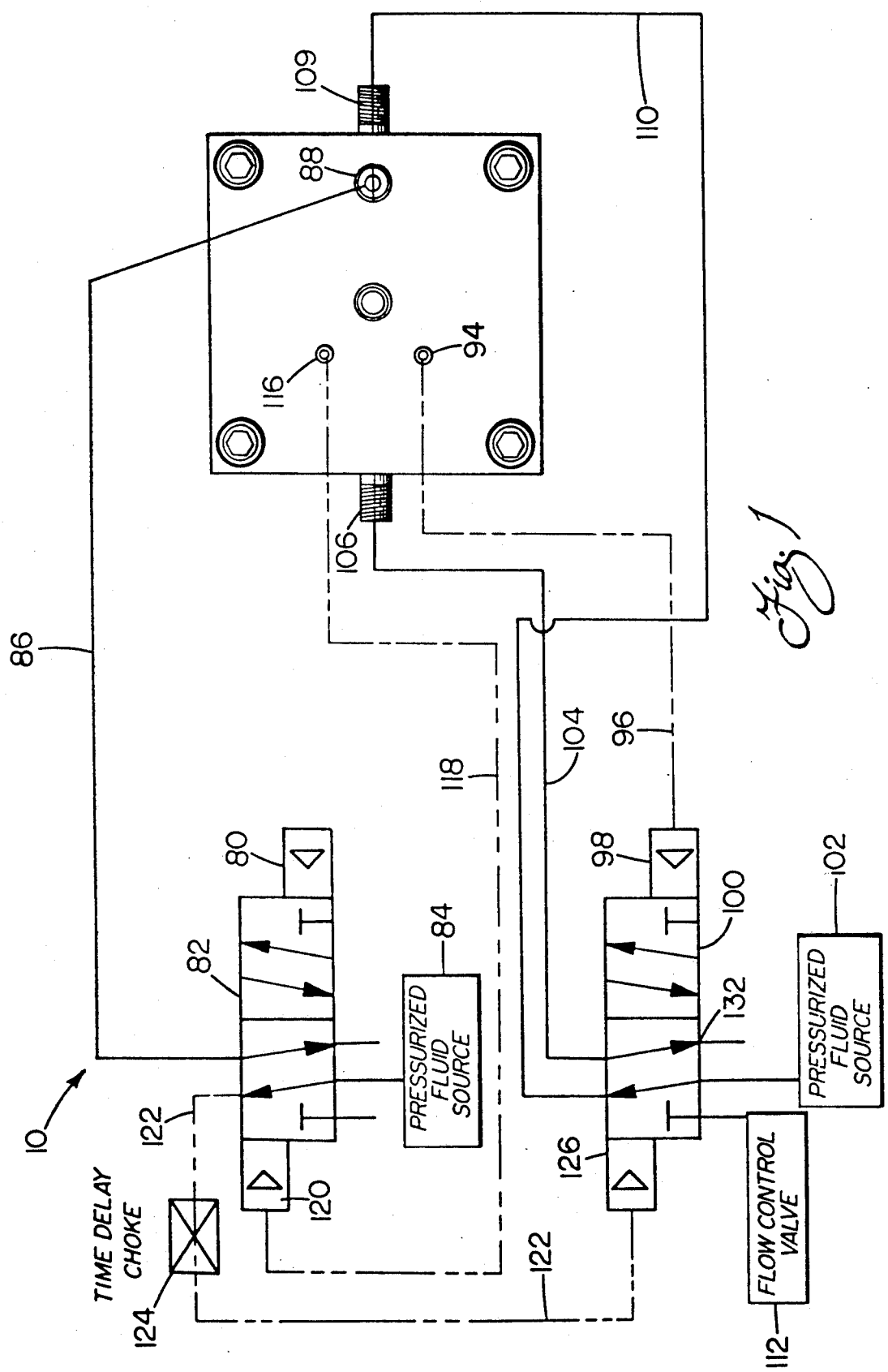

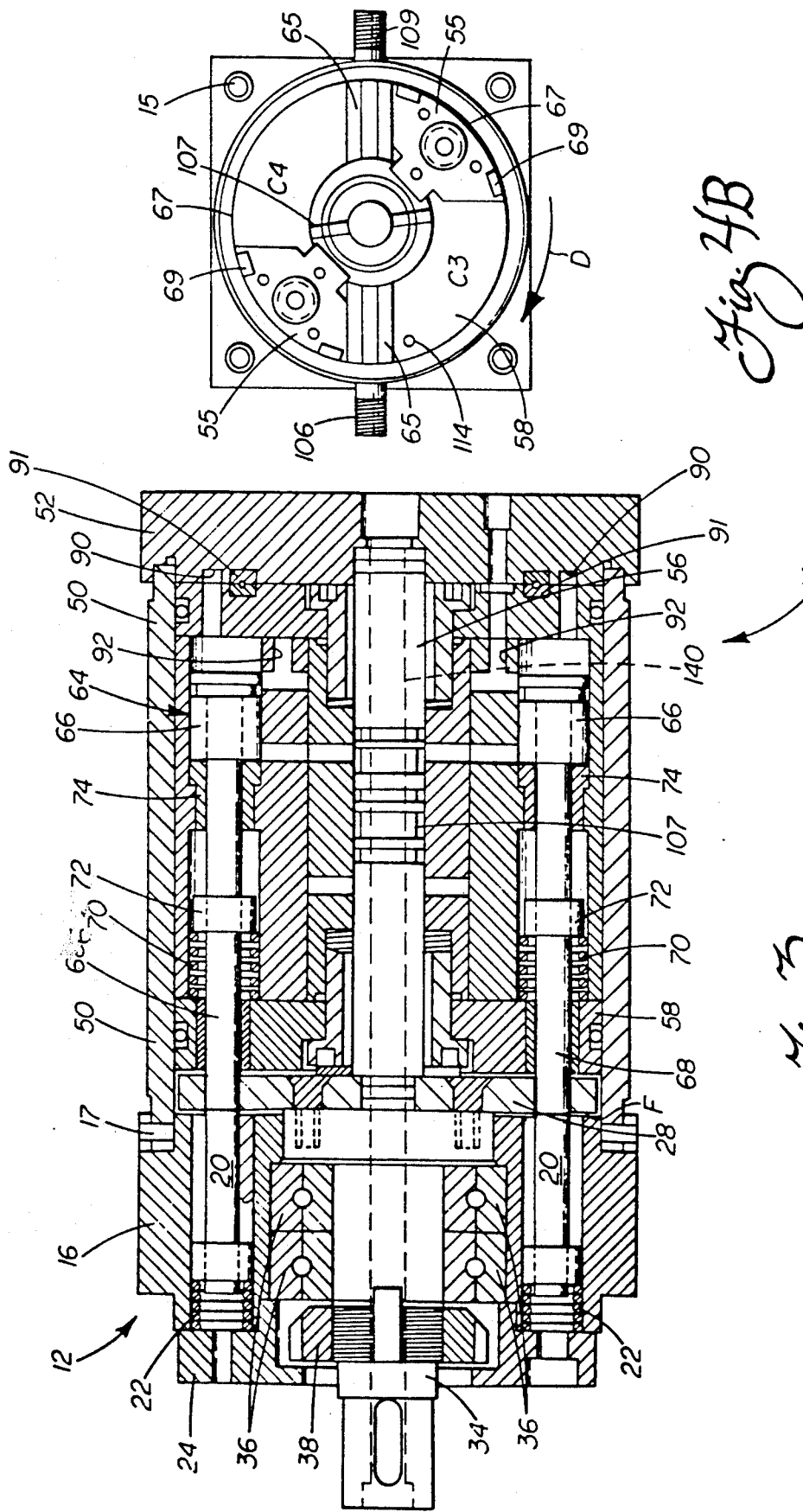

ROTARY INDEXING APPARATUS

This is a continuation-in-part of application Ser. No. 07/617,619, filed Nov. 26, 1990, now abandoned.

TECHNICAL FIELD

The present invention relates generally to the machine tool art and, more particularly, to an improved indexing apparatus for selective rotary displacement of, for example, a workpiece or a gear for driving a gear train in a precise manner.

BACKGROUND OF THE INVENTION

During various manufacturing processes and particularly cutting processes such as lathing, it is often necessary to perform a series of sequential operations on a workpiece. In order to accomplish this end, various mechanical indexing devices have been provided for accurately referencing a workpiece with respect to a manufacturing tool. An example of such an indexing device is disclosed in U.S. Pat. No. 3,451,685 to Butler.

While a number of indexing apparatus have been developed in the art, further improvements are still desired. These improvements relate to a number of characteristics including the provision of a simplified structure providing dependable performance over an extended service life. The improved indexing apparatus should also be easily adapted for automated control.

SUMMARY OF THE INVENTION

Accordingly, it is a primary object of the present invention to provide an indexing apparatus furnishing precise rotary indexing movement through a selected angle.

Another object of the present invention is to provide an indexing apparatus of relatively simple construction that is inexpensive to produce and substantially maintenance free while providing reliable performance over an extended service life.

Yet another object of the present invention is to provide a rotary indexing apparatus that particularly resists sticking/jamming to provide smooth, consistent and efficient operation.

Still another object of the present invention is to provide a rugged apparatus for angularly indexing a spindle adapted to hold a gear and thereby provide a precise, heavy duty step-type drive for a drive train.

An additional object of the present invention is to provide an angular indexing apparatus actuated by pressurized fluid and incorporating a valve arrangement. As such, the indexing apparatus is readily adapted for automated control.

Additional objects, advantages, and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved indexing apparatus is provided. More specifically, the apparatus is especially adapted for precisely angularly orienting a workpiece or a drive gear as desired in a repetitious manner.

The apparatus of the present invention includes a housing and an indexing member, in the form of a plate, mounted for rotation in the housing. Additionally, means are provided for locking or locating the indexing plate in an indexed position. Preferably, locating pins, adapted for receipt in apertures extending through the indexing plate, are provided for this purpose. The rotary indexing apparatus also includes means for indexing the indexing member through a desired angle and means for holding a workpiece, gear or the like connected to the indexing plate.

More specifically, the indexing apparatus includes at least one and preferably two locating pins that are displaceable between a home position wherein the pins extend into the plate and engage locating apertures therein and an indexing position wherein the locating pins are fully withdrawn from the plate and from engagement in the locating apertures. Preferably, each locating pin is associated with a spring that biases the pin to the home position.

The indexing means preferably comprises an indexing assembly including at least one and preferably two rotary vanes mounted for selective rotation in a cavity in the housing. The cavity is divided by a partition into a pair of compartments. One rotary vane is received in each compartment. Each rotary vane serves to divide each compartment into a pair of variable volume chambers.

An axially aligned piston and integral indexing pin is mounted for reciprocating movement in each of the rotary vanes. A spring associated with each of these pistons and integral indexing pins serves to bias the pistons and pins to the first position wherein the indexing pins are withdrawn from the spaced apertures in the indexing plate. The pistons and integral indexing pins are, however, selectively displaceable to a second position wherein the indexing pins are received within the spaced apertures in the indexing plate. As the indexing pins enter the spaced apertures, they push the locating pins from the indexing plate. When fully extended in the second position, the front faces of the indexing pins are aligned with the front face of the indexing plate. The precise positioning of the indexing pins is insured by means of a stop sleeve that is engaged by the piston head when the indexing pin reaches the second position.

In accordance with yet another aspect of the present invention, the rotary indexing apparatus includes means for actuating the indexing assembly to complete the indexing movement. More particularly, the actuating means comprises a pressurized fluid source, a means for operatively connecting the pressurized fluid source to the variable volume chambers formed in the housing as well as a means for controlling the flow of pressurized fluid through the chambers. More particularly, ports and valves are provided for selectively directing pressurized fluid between the various chambers of the housing to control relative movement of the rotary vanes.

In one embodiment a vent port is provided in an end wall of the indexing assembly to initially allow the escape of fluid and relieve pressure as the movement of the rotary vanes contracts one of the chambers during indexing. The vent port seals against the partition as the indexing assembly approaches the fully indexed position thereby trapping a cushion of the fluid in the contracting chamber. As the indexing assembly moves further toward the fully indexed position, the vent port moves past the partition seal into one of the expanding chambers to suddenly relieve the positive fluid pressure. This slows the movement of the rotary vanes as they approach the limit and thereby provides smooth operation. During indexing movement, fluid is forced from the other contracting chamber through a port from which the fluid is directed through a restricter valve that allows adjustment of the indexing speed of the apparatus.

In an alternative embodiment, the vent port is eliminated and a second cross port or cross flow passageway is added. This embodiment provides improved balance for smoother operation of the rotary cylinder assembly.

Still other objects of the present invention will become readily apparent to those skilled in this art from the following description wherein there is shown and described a preferred embodiment of this invention, simply by way of illustration of one of the modes best suited to carry out the invention. As will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principals of the invention. In the drawing:

FIG. 1 is a schematical representation showing the rotary indexing apparatus of the present invention;

FIG. 3 is a cross-sectional view similar to FIG. 2 but showing the indexing pins extended into the indexing plate forcing the locating pins out of engagement with the indexing plate;

FIG. 4A is a transverse cross-sectional view showing the rotary vanes of the rotary cylinder assembly in the home position;

FIG. 4B is a transverse cross-section view similar to FIG. 4A showing the rotary vanes in the indexed position;

Figure 2A:
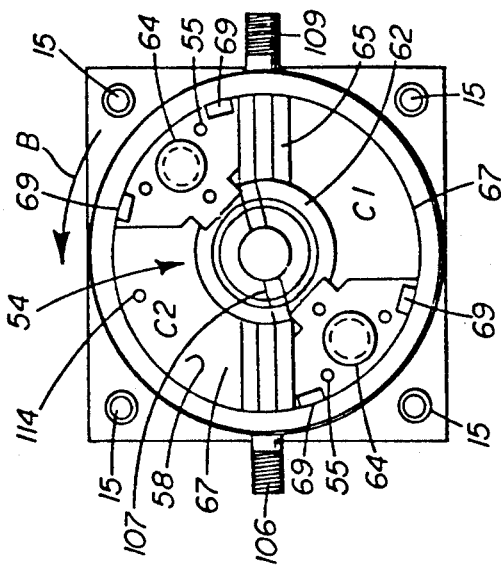
FIG. 2 is an axial cross-sectional view showing the head assembly and rotary cylinder assembly of the rotary indexing apparatus with the locating pins in position in the indexing plate securing the plate in position.

Reference will now be made in detail to the present preferred embodiment of the invention, an example of which is illustrated in the accompanying drawing.

DETAILED DESCRIPTION OF THE INVENTION

Reference is now made to FIG. 1 showing the rotary indexing apparatus 10 of the present invention. The apparatus 10 is particularly suited for precisely indexing a workpiece or gear through a desired angle. The following describes two indexing apparatus embodiments specifically adapted for indexing a workpiece or a gear through a 90° angle in the clockwise direction. It should be appreciated that these particular embodiments are only being presented as examples, however, and that the invention may be designed to index the workpiece through a different angle or even in a counter-clockwise direction, depending upon application requirements.

The rotary indexing apparatus 10 includes a head assembly 12 and rotary cylinder assembly 14 connected together by a series of bolts 15 and key pins 17 (see also FIGS. 4A and 4B). The head assembly 12 has an annular housing member 16. A pair of through holes 18 are machined in the annular housing member 16. One locating pin 20 and one spring 22 are received in each of the holes 18. The springs 22 abut against an end cap 24 that closes one end of the holes 18. Together the springs 22 bias the two locating pins 20 to an extended position wherein the pins engage in spaced apertures 26 extending entirely through an indexing plate 28. The apertures 26 are tapered so that the indexing plate 28 is self centering when engaged by the pins 20.

Figure 2:
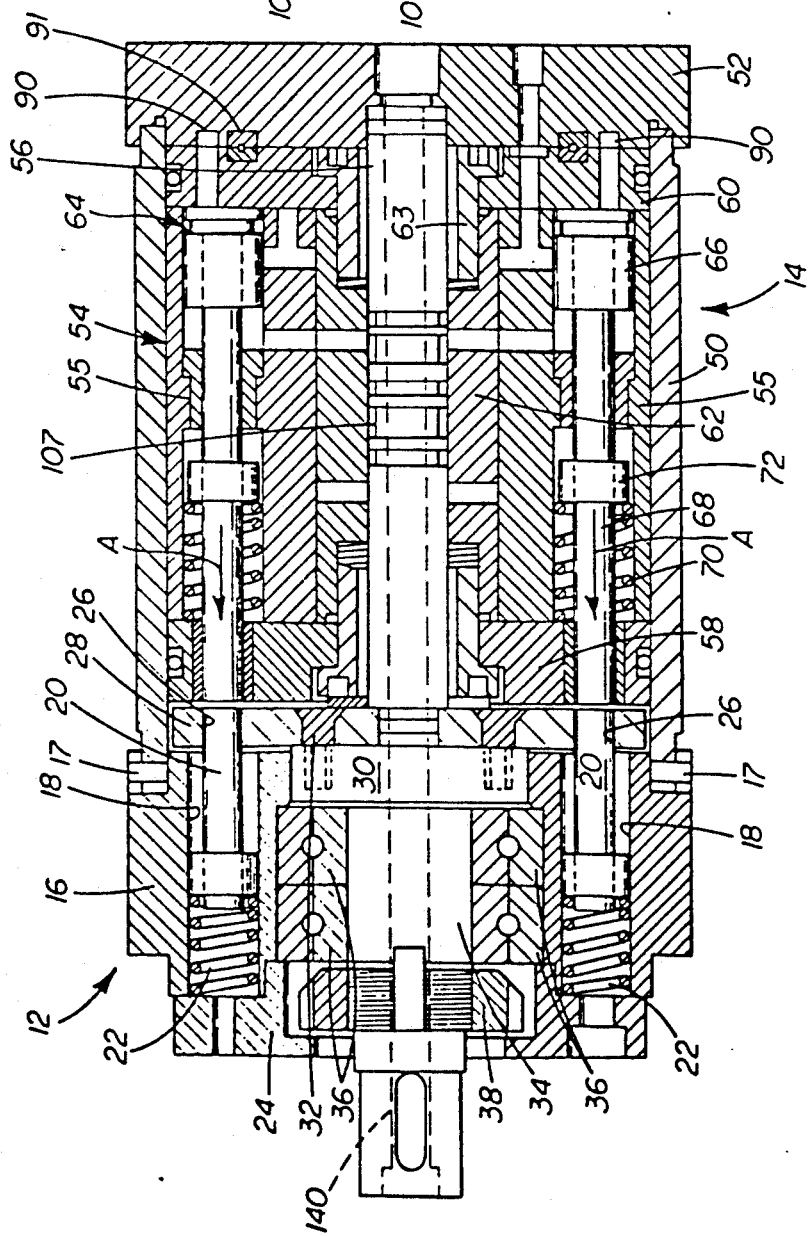

The indexing plate 28 is operatively connected to a mounting disk 30 by means of countersunk screws 32 shown schematically in phantom in FIGS. 2 and 3. The mounting disk 30 is fixed to a spindle 34 which extends through a central cavity in the angular housing 16 and an aligned aperture in the end cap 24. An adjustable chuck, gear or other desired structure to be indexed (not shown) may be mounted to the spindle 34.

As shown, the spindle 34 and, therefore, the attached indexing plate 28 are operatively mounted for rotation relative to the housing 16 and end cap 24 by means of heavy duty bearings 36. A slip clutch assembly 38 may also be operatively provided on the spindle 34 to limit the application of torque on the apparatus 10 during, for example, machining operations to a workpiece held in a chuck mounted to the spindle. This serves to prevent damage to the apparatus 10 when placed under exceedingly high loads.

The rotary cylinder assembly 14 includes a cylindrical housing member 50 sealed at one end by an end cap 52. An indexing assembly 54 including a pair of diametrically opposed rotary vanes 55 is mounted for relative rotation within a cavity in the housing 50 on a stationary shaft 56. As shown, the indexing assembly 54 includes front and rear end plates 58, 60 respectively and a hub member 62. A pair of spacer rings 63, mounted on the shaft 56 engage the hub member 62 and hold the indexing assembly 54 in proper axial position on the shaft thereby insuring smooth, efficient operation. A partition plate 65 divides the cavity into a pair of independent compartments 67. One rotary vane 55 is received in each compartment 67 and serves to divide each compartment into a pair of variable volume chambers C1, C2, C3, C4. The rotary vanes 55 ride on the bearings 69 during rotation in the housing 50.

As best shown in viewing FIGS. 2, 3 4A and 4B, the indexing assembly 54 includes two axially aligned piston assemblies 64, one in each rotary vane 55. As shown, each piston assembly 64 includes a piston head 66 fixed to an indexing pin 68 which extends through an aperture in the front end plate 58. A pair of springs 70 engage collars 72 fixed to the indexing pins 68 and serve to bias the indexing pins and piston heads 66 to a fully retracted position wherein the pins are fully held within the indexing assembly 54 (see FIG. 2).

As will be appreciated from the following operational description, the piston assemblies 64 may also be actuated by positive fluid pressure and thereby displaced to a second, extended position. In this position the distal ends of the indexing pins 68 extend into the apertures 26 in the indexing plate 28. When this is done, the locating pins 20 are forced against the biasing of the springs 22 until pushed fully from the indexing plate 28. A stop sleeve 74 mounted about each indexing pin 68 is engaged by the front face of the associated piston head 55 when in the fully extended position (note FIG. 3). This engagement insures that the front face of the indexing pins 68 extends precisely to but not beyond the front face F of the indexing plate 28. The sleeves 74 also insure proper alignment of the piston assemblies 64 in their cylinders.

Once in the position shown in FIG. 3, the rotary cylinder assembly 14 may be actuated to index the indexing plate 28 and, hence, the spindle 34 and workpiece connected thereto precisely 90°. Advantageously, by engaging the indexing plate 28 with two diametrically opposed indexing pins 68 as shown, a balanced rotary force is applied, thereby preventing binding and insuring smooth operation.

The operation of the rotary indexing apparatus 10 of the present invention will now be described in detail. The index sequence is initiated with the locating pins 20 extending into the apertures 25 in the indexing plate 28 as shown in FIG. 2 and the indexing assembly 54 in the home position shown in FIG. 4A. A momentary pulse input signal is applied to the actuator 80 of valve 82. The signal may be provided by electrical solenoid, air pilot or mechanical actuator or any other means known in the art as desired. This input signal causes the valve 82 to shift to the left as shown in FIG. 1 and supply pressurized fluid from a pressurized fluid source 84 through the line 86 to the indexer port 88. The pressurized fluid flows from the port 88 through the arcuate feed passages 90 (note FIGS. 2 and 3) where it is directed behind the piston heads 66 of the axially aligned piston assemblies 64 in the rotary vane assembly 54.

The buildup in pressure causes the piston heads 66 and attached indexing pins 68 to slide along their respective cylinders in the direction of action arrow A (note FIG. 2). An annular seal 91 engages the end plate 60 to firmly back the indexing assembly 54. This seal aids in keeping the rotary vanes 55 from binding in the cavity. The piston heads 66 and indexing pins 68 continue to move in the direction of action arrow A until the indexing pins slide fully into the apertures 26 in the indexing plate 28 thereby pushing the locating pins 20 completely from within the indexing plate as shown in FIG. 3. As the indexing pins 68 move, pressure on the left side of the piston head is relieved by bleeding through the apparatus 10 to atmosphere (note openings in, for example, end cap 24).

As the indexing pins 68 reach a fully extended position in the apertures 26 in the indexing plate 28, pressurized fluid escapes through the exhaust passage 92, indexer port 94 and along line 96 to the actuator 98 of the valve 100. The actuator 98 then shifts the valve 100 so that the pressurized fluid from a pressurized fluid source 102 is supplied along line 104 to indexer port 106. The pressurized fluid moves from the port 106 along feed passages and begins filling the chambers C3, C4 (note connecting cross port 107). This causes the indexing assembly 54 to rotate in the direction of action arrow B as shown in FIG. 4A.

Fluid exhausting from the contracting chamber Cl feeds through the port 109 and along the line 110, through the valve 100 through a flow control valve 112. This valve 112 is adjustable to control the speed at which the rotary indexing apparatus 10 rotates. As shown, chamber C2 is simultaneously vented to atmosphere through port 114 in the front end plate 58. The vent port 114 is located so that near the end of the indexing stroke the port is sealed off behind the partition plate 65. Thus, a fluid cushion is produced in the chamber C2 before full indexing has occurred. Still closer to the end of the indexing stroke, the vent port 114 passes by the seal in the partition plate 65 and communicates with the chamber C3 (note FIG. 4B). This allows fluid pressure build up in chambers C3 and C4 (note cross port 107) to escape to atmosphere. Together, the fluid cushion trapped in chamber C2 and the venting of pressurized fluid from chambers C3 and C4 serve to decelerate the indexing assembly 54 toward the end of the indexing stroke so as to provide smooth operation. Additionally, fluid pressure at the port 94 is vented through the housing 16, 24, 50, 52 to atmosphere once rotation of the indexing assembly 54 is initiated.

When the indexing assembly 54 reaches the fully indexed position shown in FIG. 4B, a pressurized fluid signal is produced at port 116 and along line 118 to initiate the actuator 120 of valve 82. When this occurs, pressurized fluid is cut off to the feed line 86, port 88 and feed passages 90. As a result the springs 58 bias the indexing pins 68 back to the retracted position wherein the pins are fully retained within the indexing assembly 54. Substantially simultaneously, the locating pins 20 are biased by means of the springs 22 to extend fully into a new pair of spaced apertures 26 (90° removed from or perpendicularly aligned with respect to the first pair) now brought into alignment therewith.

With the shifting of the valve 82 to the position shown in full line in FIG. 1, pressurized fluid is directed from the source 84 along the line 122 through a time delay choke 124. The time delay choke 124 serves to provide a time delay that allows the indexing pins 68 to fully retract into the indexing assembly 54 before rotating the assembly back to the home position.

The pressurized fluid feeding through line 122 causes the actuator 126 of valve 100 to shift the valve to the full line position shown in FIG. 1 and supply pressurized fluid from the fluid source 102 along the line 110 to the indexer port 109. The pressurized fluid directed through port 109 fills the chamber Cl thereby rotating the indexing assembly 54 in the direction of action arrow D (note FIG. 4B) and returning the indexing assembly to the home position shown in FIG. 4A. As this occurs, fluid in Chambers C3 and C4 (again note cross port 107 connecting chamber C3, C4) is initially vented to atmosphere through the port 114. Shortly after initiating the return stroke, however, the vent port 114 passes by the seal in the partition plate 65 and is no longer in communication with the chamber C3. At this point fluid in chambers C3 and C4 (again note cross port 107) is exhausted to atmosphere through indexer port 106, line 104 and port 132 of valve 100. The apparatus is now ready for the next cycle.

Figure 5B:
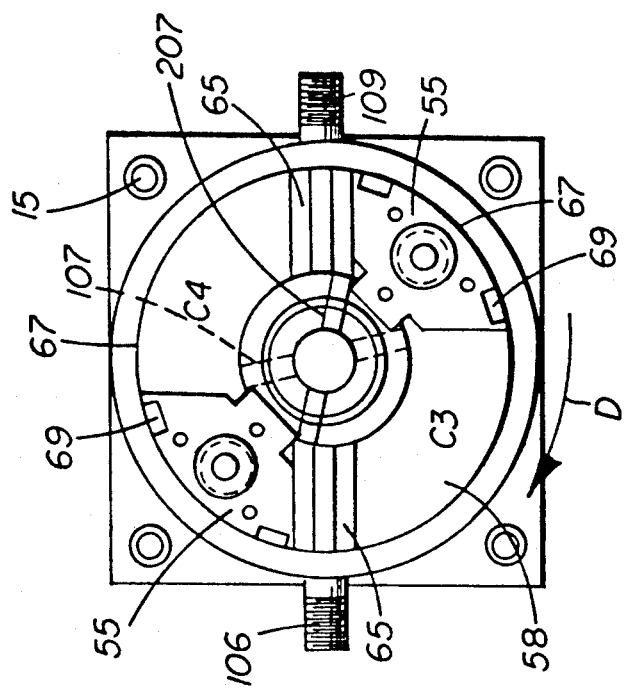
FIG. 5B is a transverse cross-sectional view similar to FIG. 5A showing the rotary vanes in the indexed position.
Figure 5A:
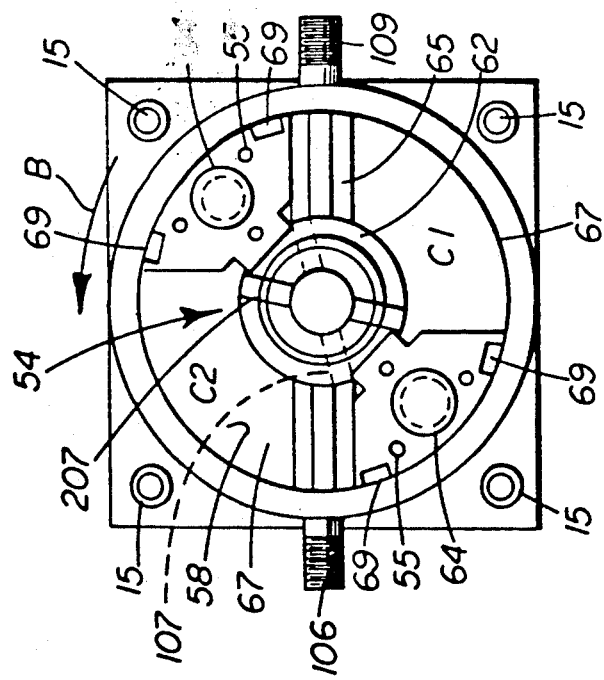
FIG. 5A is a transverse cross-sectional view of an alternative embodiment of the invention showing the rotary vanes of the rotary cylinder assembly in the home position.

In the alternative embodiment shown in FIGS. 5A and 5B, the vent port 114 is eliminated and a second cross port or cross flow passageway 207, similar to the cross port 107, is provided. The second cross port 207 provides fluid communication between the chambers Cl and C2 in the same manner that the cross port 107 provides fluid communication between the chambers C3 and C4.

In the alternative embodiment the index sequence is initiated as previously described with the locating pins 20 extending into the apertures 26 in the indexing plate 28 and the indexing assembly 54 in the home position as shown in FIG. 5A. A momentary pulse input signal is applied to the actuator 80 of valve 82. The signal may be provided by electrical solenoid, air pilot or mechanical actuator or any other means known in the art as desired. The input signal causes the valve 82 to shift to the left as shown in FIG. 1 and supply pressurized fluid from a pressurized fluid source 84 through the line 86 to the indexer port 88. This air is directed as described above behind the piston head 66 of the axial aligned piston assembly 64 in the rotary vane assembly 54. The build up in pressure causes the piston heads 66 and attached indexing pins 68 to slide along the respective cylinders fully into the apertures 26 in the indexing plate 28. Accordingly, the locating pins 20 are completely pushed from within the indexing plate as shown in FIG. 3.

As the indexing pins 68 reach a fully extended position in the apertures 26, the pressurized fluid escapes through the exhaust passage 92, indexer port 94 and along line 96 to the actuator 98 of the valve 100. The actuator 98 then shifts the valve 100 so that the pressurized fluid from a pressurized fluid source 102 is supplied along line 104 to indexer port 106. The pressurized fluid moves from the port 106 along feed passages and begins filling the chambers C3, C4 (note connecting cross port 107). This causes the indexing assembly to rotate in the direction of action arrow B as shown in FIG. 5A.

Fluid exhausting from the contracting chamber C1 feeds through the port 109 and along the line 110, through the valve 100 through a flow control valve 112. This valve 112 is adjustable to control the speed at which the rotatory indexing apparatus rotates. As shown, chamber C2 is simultaneously exhausted in the same manner by means of the cross port 207 that provides fluid communication between the chambers C1 and C2. Additionally, fluid pressure at the port 104 is vented through the housing 16, 24, 50, 52 to atmosphere once rotation of the indexing assembly 54 is initiated.

When the indexing assembly 54 reaches the fully indexed position shown in FIG. 5B, a pressurized fluid signal is produced at port 116 and along line 118 to initiate the actuator 120 of valve 82. When this occurs, pressurized fluid is cut off to the feed line 86, port 88 and feed passages 90. As a result the springs 58 bias the indexing pins 68 back to the retracted position wherein the pins are fully retained within the indexing assembly 54. Substantially simultaneously, the locating pins 20 are biased by means of the springs 22 to extend fully into a new pair of spaced apertures 26 (90° removed from or perpendicularly aligned with respect to the first pair) now brought into alignment therewith.

With the shifting of the valve 82 to the position shown in full line in FIG. 1, pressurized fluid is directed from the source 84 along the line 122 through a time-delay choke 124. The time delay choke 124 serves to provide a time-delay that allows the indexing pins 68 to fully retract into the indexing assembly 54 before rotating the assembly back to the home position.

The pressurized fluid feeding through the line 122 causes the actuator 126 of valve 100 to shift the valve to the full line position shown in FIG. 1 and supply pressurized fluid from the fluid source 102 along the line 110 to the indexer port 109. The pressurized fluid directed through the port 109 fills the chamber C1 and the chamber C2 through the cross port 207 thereby rotating the indexing assembly 54 in the direction of action arrow D (note FIG. 4B) and returning the indexing assembly to the home position shown in FIG. 5A. As this occurs, fluid in chambers C3 and C4 (again note cross port 107 connecting chambers C3, C4) is exhausted to atmosphere through indexer port 106, line 104 and port 132 of valve 100. The apparatus is now ready for the next cycle.

It should be recognized that interface with machine controls may be accomplished with either electrical or pneumatic control circuits. Further, an air port 140 may be provided extending through the apparatus 10 and, more particularly, the end cap 52, shaft 56, indexing plate 28, mounting disk 30 and spindle 34. This feature may be used for a number of purposes including as a passageway through which to apply positive fluid pressure to expel a workpiece from a chuck or, for example, to fill a pressurized fluid manifold as shown in copending application Ser. No. 07/618,664, entitled SPINDLE APPARATUS FOR HOLDING A WORKPIECE and filed Nov. 27, 1990.

In summary, numerous benefits result from employing the concepts of the present invention. The rotary indexing apparatus of the present invention is relatively inexpensive to produce over an extended service life. The apparatus is specifically designed to resist sticking and jamming and provide smooth and efficient performance. In fact, the apparatus can complete a cycle lock-to-lock in as little as approximately three seconds so as to maintain high productivity levels. Hence, the apparatus is compatible with high speed production equipment systems. Advantageously, operation of the apparatus 10 may be readily automated and controlled through the selective application of pressurized fluid through various ports and feed passageways to provide precise indexing movement.

The foregoing description of the preferred embodiment of the invention has been presented for purposes of illustration and description. It is not intended to be exhaustive or to limit the invention to the precise form disclosed. Obvious modifications or variations are possible in light of the above teachings. The preferred embodiment was chosen and described to provide the best illustration of the principals of the invention and its practical application to thereby enable one of ordinary skill in the art to utilize the invention in various embodiments and various modifications as are suited to the particular use contemplated. All such modifications and variations are within the scope of the invention as determined by the appended claims when interpreted in accordance with the breadth to which they are fairly, legally and equitably entitled.

I claim:

1. A rotary indexing apparatus for a workpiece, comprising:
a housing;
an indexing member mounted for rotation in said housing;
means for locking said indexing member in an indexed position;
means for indexing said indexing member through a desired angle said indexing means including a rotary cylinder assembly including at least one rotary vane mounted for selective rotation in said housing, said at least one rotary vane further including a piston and integral indexing pin mounted for axial reciprocating movement in said at least one rotary vane; and
means for holding a workpiece connected to said indexing member.

2. The indexing apparatus set forth in claim 1, wherein said indexing member is a plate including a series of spaced apertures extending through said plate and said locking means further comprises at least one locating pin displaceable between a home position wherein at least one said locating pin extends into said plate and engages one of said apertures and an indexing position wherein said at least one locating pin is fully withdrawn from said plate and from engagement in said one aperture.

3. The indexing apparatus set forth in claim 2, including means for biasing said at least one locating pin into said home position.

4. The indexing apparatus set forth in claim 3, further comprising means for biasing said piston and integral indexing pin to a first position wherein said indexing pin is withdrawn from one of said apertures in said indexing member into said at least one rotary vane; said piston and integral indexing pin being selectively displaceable to a second position wherein said indexing pin is received within one of said apertures in said indexing member.

5. The indexing apparatus set forth in claim 4, including a stop sleeve for holding said piston in alignment in said at least one rotary vane and means for engaging said sleeve and setting said second position of said indexing pin.

6. The indexing apparatus set forth in claim 5, including means for actuating said indexing means.

7. The indexing apparatus set forth in claim 6, wherein said actuating means comprises a pressurized fluid source, means for operatively connecting said pressurized fluid source to said housing and means for controlling the flow of pressurized fluid through said housing.

8. The indexing apparatus set forth in claim 7, wherein said at least one rotary vane serves to divide said cavity into first and second chambers, said control means including valve means and ports for selectively directing pressurized fluid between said first and second chamber to control relative movement of said at least one rotary vane.

9. The indexing apparatus set forth in claim 8, further including vent means for exhausting air from said chambers.

10. The indexing apparatus set forth in claim 1, including means for actuating said indexing means, said actuating means including a pressurized fluid source, means for operatively connecting said pressurized fluid source to said housing and means for controlling the flow of pressurized fluid through said housing.

11. The indexing apparatus set forth in claim 10, wherein said at least one rotary vane is mounted in a cavity in said housing and serves to divide said cavity into first and second chambers, and wherein said control means includes valve means and ports for selectively directing pressurized fluid between said first and second chambers to control relative movement of said at least one rotary vane.

12. The indexing apparatus set forth in claim 1, including an air port extending through said holding means, indexing member, indexing means and housing.

13. A rotary indexing apparatus for a workpiece, comprising:
a housing;
an indexing member mounted for rotation in said housing;
means for locking said indexing member in an indexed position;
means for indexing said indexing member through a desired angle, said indexing means being mounted for relative rotation within a cavity in said housing;
partition means for dividing said cavity into a pair of compartments;
vane means on said indexing means dividing each of said compartments into two variable volume chambers;
a piston and integral indexing pin mounted for reciprocating movement in said vane means; and
means for holding a workpiece connected to said indexing member.

14. The indexing apparatus set forth in claim 13, further including means for actuating said indexing means, said actuating means including a pressurized fluid source, means for operatively connecting said pressurized fluid source to said chambers and means for controlling the flow of pressurized fluid through said chambers.

15. The indexing apparatus set forth in claim 14, wherein said controlling means includes first and second cross ports, said first cross port providing fluid communication between a first opposed pair of said variable volume chambers and said second cross port providing fluid communication between a second opposed pair of said variable volume chambers.

* * * * *